(12) United States Patent
Rajasekharan et al.

(10) Patent No.: US 9,153,256 B2
(45) Date of Patent: Oct. 6, 2015

(54) SLIDER WITH SELF-ASSEMBLED MONOLAYER PATTERN

(71) Applicant: Seagate Technology LLC, Cupertino, CA (US)

(72) Inventors: Ajaykumar Rajasekharan, Bloomington, MN (US); David J. Ellison, Minneapolis, MN (US); Qian Guo, Fremont, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 48 days.

(21) Appl. No.: 13/938,584

(22) Filed: Jul. 10, 2013

(65) Prior Publication Data

US 2015/0015996 A1    Jan. 15, 2015

(51) Int. Cl.
*G11B 5/255* (2006.01)
*G11B 5/31* (2006.01)
*G11B 5/60* (2006.01)
*G11B 5/41* (2006.01)

(52) U.S. Cl.
CPC ............... *G11B 5/3106* (2013.01); *G11B 5/255* (2013.01); *G11B 5/41* (2013.01); *G11B 5/6082* (2013.01)

(58) Field of Classification Search
CPC ..................................................... G11B 5/255
USPC ........... 360/234.3, 235.1, 235.2, 235.3, 235.4
See application file for complete search history.

(56) References Cited

U.S. PATENT DOCUMENTS

| | | | |
|---|---|---|---|
| 4,327,387 A | 4/1982 | Plotto | |
| 5,023,738 A * | 6/1991 | Prenosil | 360/122 |
| 5,425,988 A * | 6/1995 | Ogawa et al. | 360/122 |
| 6,249,403 B1 * | 6/2001 | Tokisue et al. | 360/235.2 |
| 6,822,833 B2 | 11/2004 | Yang et al. | |
| 6,893,966 B2 | 5/2005 | Delamarche et al. | |
| 7,327,535 B2 | 2/2008 | Feng et al. | |
| 7,357,875 B2 | 4/2008 | Feng et al. | |
| 7,746,600 B2 | 6/2010 | Hancer et al. | |
| 7,855,858 B2 | 12/2010 | Hancer et al. | |
| 2007/0042154 A1 | 2/2007 | Hancer et al. | |
| 2007/0196673 A1 | 8/2007 | Hancer et al. | |
| 2007/0224452 A1 | 9/2007 | Sasa et al. | |
| 2009/0310257 A1 * | 12/2009 | Musashi et al. | 360/234.3 |
| 2010/0002339 A1 * | 1/2010 | Imamura et al. | 360/234.3 |
| 2011/0205665 A1 | 8/2011 | Jones et al. | |

OTHER PUBLICATIONS

Zhang et al., "Growth of self-assembled monolayer on tetrahedral amorphous carbon film coated magnetic head" Surface & Coatings Technology 202, pp. 3451-3456 (2008).

* cited by examiner

*Primary Examiner* — Craig A. Renner
(74) *Attorney, Agent, or Firm* — HolzerIPLaw, PC

(57) ABSTRACT

A slider, having a leading edge, a trailing edge, a working surface, and read/write heads proximate the trailing edge. The slider includes a protective overcoat over the working surface of the slider, and a self-assembled monolayer coating on the working surface of the slider and over the protective overcoat, the coating comprising at least one self-assembled monolayer material.

19 Claims, 3 Drawing Sheets

SLIDER WITH SELF-ASSEMBLED MONOLAYER PATTERN

BACKGROUND

Hard disc drives are common information storage devices having of a series of rotatable discs that are accessed by magnetic reading and writing elements. These data elements, commonly known as transducers, are typically carried by and embedded in a slider that is held in a close relative position over discrete data tracks formed on a disc to permit a read or write operation to be carried out. In use, high speed rotation of the disc generates a stream of air flow along its surface that cooperates with the air bearing surface (ABS) of the slider body which enables the slider to "fly" above the spinning disc, positioning the transducers to access data on the disc.

As distances between the slider and the disc decrease, due to the ever-growing desire to reduce the size of the disc drive and to pack more data per square inch, the potentially negative impact on any contamination on the slider increases. Unwanted contaminants on the slider can adversely affect fly height behavior, such as elevated or decreased fly height, fly asymmetry in roll or pitch character, excessive modulation, and head-disc crashing or contact by contaminant build up and accumulation on the slider and/or "bridging" mechanisms between the head and disc. All of these mechanisms result in degraded performance of the read or write operation of the head (e.g. skip-writes, modulated writers, weak writes, clearance stability and settling, and incorrect clearance setting). What is needed is a mechanism to remove contaminants from between the slider and the disc surface.

SUMMARY

The present disclosure provides a slider having a surface coating thereon, configured to provide a path for fluid and contaminants carried thereby to be removed from the slider surface.

One particular embodiment of this disclosure is a slider, having a leading edge, a trailing edge, a working surface, and read/write heads proximate the trailing edge. The slider includes a continuous protective overcoat having a thickness of at least 50 Angstroms over the working surface of the slider, and a self-assembled monolayer coating on the working surface of the slider and over the protective overcoat, the coating comprising at least one self-assembled monolayer material.

Another particular embodiment of this disclosure is a slider with a working surface having at least one recessed feature extending to its trailing edge. The slider includes a continuous protective overcoat on at least a portion of the working surface, and a self-assembled monolayer coating on the working surface, the coating comprising at least one self-assembled monolayer material.

Yet another particular embodiment of this disclosure is a slider that has a predetermined pattern of a self-assembled monolayer coating on the working surface of the slider, the predetermined pattern being symmetrical about a longitudinal axis of the slider.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

The present embodiments relate most generally to coatings on magnetic sliders for disc drives. The surface of the slider is formed from a ceramic and/or alumina body that has a protective overcoat (e.g., protective carbon overcoat) on certain regions. A self-assembled monolayer coating is formed on the slider surface in a pattern configured to direct the flow of fluid (e.g. disc lubricants, organic contaminants, silicones, particulates, etc.).

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Figure 1:
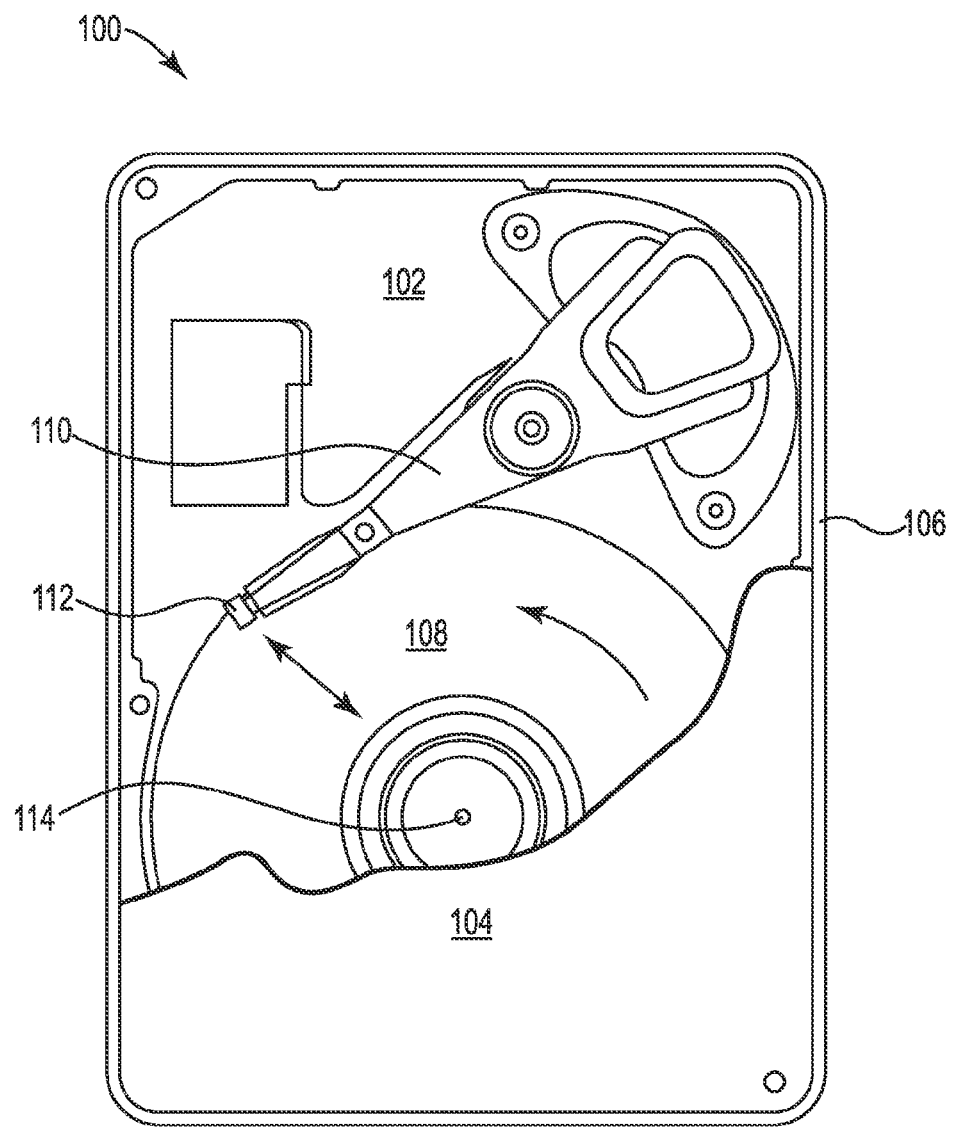
FIG. 1 is a schematic, top view of a hard disc drive.

Referring to FIG. 1, an exemplary magnetic disc drive 100 is schematically illustrated. Disc drive 100 includes base 102 and top cover 104, shown partially cut away. Base 102 combines with top cover 104 to form a housing 106, in which is located one or more rotatable magnetic data storage media or discs 108. Magnetic storage media 108 are attached to spindle 114 for co-rotation about a central axis. It should be noted that a pack of multiple discs or media 108 is utilized in some embodiments, and only a single disc or medium 108 is used in other embodiments. Each disc or medium surface has an associated head or slider 112 which is mounted adjacent to and in communication with its corresponding disc or media 108. Head or slider 112 includes a data recording transducer and a data reading transducer (also referred to as read/write heads, and the like), which read and write data to storage disc or media 108. In the example shown in FIG. 1, head or slider 112 is supported by an actuator assembly 110, composed of various elements that are known in the field. The actuator assembly 110 shown in FIG. 1 is of the type known as a rotary moving coil actuator and includes a voice coil motor to rotate actuator assembly 110 with its attached slider 112 to position slider 112 and its read/write heads over a desired data track along an arcuate path between an inner diameter and an outer diameter of disc of media 108.

Many heads or sliders 112 are formed from alumina titanium carbide (AlTiC), which has a high energy surface. Contaminant particles, moisture and lubricant (e.g., from the disc or media 108 or from spindle 114) easily adhere or adsorb to the surface of slider 112. In addition, the composite structure of AlTiC tends to release particles from its grains due to shock and contact events causing drives to crash or fail when the slider runs over a particle at high speed. Because of this, head or slider 112 includes a protective overcoat over various features of slider 112, such as the read head, the write head, the air bearing surface (ABS) or rails, and/or the entire advanced air bearing (AAB) surface. The protective overcoat may be, for example, diamond-like carbon (DLC), which has a crystal lattice similar to diamond, and/or an amorphous carbon layer. In some embodiments, the protective overcoat may have a {100} crystal plane. The protective overcoat is a continuous and non-interrupted layer, devoid of pinholes or other flaws in the coating. The protective overcoat has a thickness of at least 50 Angstroms, in some embodiments at least 100 Angstroms.

In accordance with this invention, present over at least a portion of the protective overcoat and the slider body surface (e.g., AlTiC) is a self-assembled monolayer (SAM). The terms "self-assembled monolayer" and "SAM" as used herein refer to a thin monolayer wherein surface-active molecules present in a reaction solution are provided (e.g., adsorbed and/or chemisorbed) on the surface of the protective overcoat to produce chemical bonds therebetween. The SAM is present in a pattern that directs the flow of fluid (e.g., air, liquid, particulate, contaminants) in a desired direction and/or to a desired location; the SAM may be, for example, a high surface energy SAM or a low surface energy SAM. In some embodiments more than one SAM is present; for example, a pattern may be formed from a low surface energy SAM and a high surface energy SAM.

The term "low surface energy" and variations thereof, as used herein, refers to the tendency of a surface to resist wetting (high contact angle) or adsorption by other unwanted materials or solutions; whereas, "high surface energy" refers to the tendency of a surface to increase or promote wetting (low contact angle) or adsorption by other unwanted materials or solutions. In a low surface energy material, such as a low energy SAM, the functional terminal groups of the molecules are chosen to result in weak physical forces (for example, Van der Waals) between the coating and liquid and thus allow for partial wetting or no wetting of the resulting coating (i.e., a high contact angle between a liquid and the coating). Conversely in a high surface energy material, such as a high energy SAM, the functional terminal groups of molecules are chosen to result in a stronger molecular force between the coating and liquid and allow for full wetting of the of the liquid (i.e., a very small contact angle between a liquid and the coating). Values that are representative of "low surface energy" are in the range of 5-30 dyne/cm and high surface energy materials are relatively higher than this range, typically anything greater than 30 dyne/cm. When both a high surface energy coating and a low surface energy coating are present in this disclosure, the surface energies are relevant. When only one of a high surface energy coating or a low surface energy coating are present in this disclosure, the surface energy is in respect to the surface on which the coating is applied (e.g., a protective carbon overcoat).

The precursor compound for forming the self-assembled monolayer or SAM contains molecules having a head group and a tail with a functional end group. Common head groups include thiols, silanes with hydrolizable reactive groups (e.g., halides: {F, Cl, Br, I}, and alkoxys: {methoxy, ethoxy, propoxy}, phosphonates, etc. Common tail groups include alkyls with 1-18 carbon atoms in addition to other unsaturated hydrocarbon variants, such as, aryl, aralkyl, alkenyl, and alkenyl-aryl. In addition the hydrocarbons materials listed above can be functionalized with fluorine substitutions, amine terminations, as well as carbon oxygen functional groups such as ketones and alcohols, etc. SAMs are created by chemisorption of the head groups onto the substrate material (i.e., in this application, onto the slider body and protective overcoat) from either a vapor or liquid phase, by processes such as immersion or dip coating, spraying, chemical vapor deposition (CVD), micro-contact printing, dip-pen nanolithography, etc. The head groups closely assemble on the material with the tail groups extending away from the material. The self-assembled monolayer can be, for example, an organosilane (e.g. alkyl trichlorosilane, fluorinated alkyl trichlorosilane, alkyl trialkyloxysilane, fluorinated alkyl trialkyloxysilane, etc.).

The precursor compound of the SAM may be present in any conventionally-used organic solvent, water, or any mixture thereof. Examples of suitable organic solvents may include, but are not limited to, alcohols (e.g., methyl alcohol, ethyl alcohol, n-propyl alcohol, isopropyl alcohol, n-butyl alcohol, sec-butyl alcohol, t-butyl alcohol, isobutyl alcohol, and diacetone alcohol); ketones (e.g., acetone, methylethylketone, methylisobutylketone); glycols (e.g., ethyleneglycol, diethyleneglycol, triethyleneglycol, propyleneglycol, butyleneglycol, hexyleneglycol, 1,3-propanediol, 1,4-butanediol, 1,2,4-butantriol, 1,5-pentanediol, 1,2-hexanediol, 1,6-haxanediol); glycol ethers (e.g., ethyleneglycol dimethyl ether, and triethyleneglycol diethyl ether); glycol ether acetates (e.g., propylene glycol monomethyl ether acetate (PGMEA)); acetates (e.g., ethylacetate, butoxyethoxy ethyl acetate, butyl carbitol acetate (BCA), dihydroterpineol acetate (DHTA)); terpineols (e.g., trimethyl pentanediol monoisobutyrate (TEXANOL)); dichloroethene (DCE); chlorobenzene; and N-methyl-2-pyrrolidone (NMP).

The concentration of the precursor compound in the solution may be determined by those skilled in the art according to the intended applications and purposes and may be in the range of about 5 to about 20 mM. An immersion step may be performed without particular limitation and may be carried out at room temperature for about 20 to 120 minutes. Similarly, other methods may be carried out by conventional means.

The precursor compound for forming the self-assembled monolayer is selected so that the resulting SAM has the desired properties. In some patterns, a low surface energy SAM is desired. An example of a commercially available low surface energy SAM is 1H,1H,2H,2H-perfluorodecyltrichlorosilane (alternately, heptadecafluoro-1,1,2,2-tetrahydro-decyl-1-trichlorosilane) [CAS: 78560-44-8], of course, other low surface energy SAM materials could be used. In general the class of fluorinated organosilane derivatives would work as low energy SAM materials. Other examples of commercially available low surface energy SAMs include: trifluoropropyltrimethoxysilane, heneicosafluorododecyltrichlorosilane, nonafluorohexyltrimethoxysilane, methyltrichlorosilane, ethyltrichlorosilane, propyltrimethoxysilane, hexyltrimethoxysilane, n-octyltriethoxysilane, n-decyltrichlorosilane, dodecyltrichlorosilane, and octadecyltrichlorosilane. In other patterns, a high surface energy SAM is desired. An example of a commercially available high surface energy SAM is (3-aminopropyl)-trimethoxysilane [CAS: 13822-56-5]. Of course, other high surface energy SAM materials could be used. The general class of organosilanes with amine, alcohol, or mercapto substituents would provide for a high surface energy SAM, relative to the above. Some commercially available examples include: (3-Mercaptopropyl)trimethoxysilane, methyl 11-[dichloro(methyl)silyl]undecanoate, acetoxyethyltrichlorosilane, and vinyltriethoxysilane.

The SAM pattern occupies at least 10% of the surface area of the bottom of the slider (i.e., the ABS or side of the slider opposite the disc or media), in some embodiments at least 20% or at least 25%. In some embodiments, the SAM pattern may occupy up to 100% of the ABS. The SAM pattern is typically symmetrical about the longitudinal axis of the slider, although there may be embodiments where the pattern is not symmetrical. In addition, two or more SAM molecules could be co-deposited for a randomized, mixed film with multiple SAM molecule moieties.

FIGS. 2 through 5 illustrate two examples of a SAM pattern on a slider, both patterns formed by two SAM materials. In other embodiments, not illustrated, the pattern may be formed by one SAM material or by more than two SAM materials. Whether formed with one, two, or any number of SAM materials, the pattern is configured to direct the flow of fluid (e.g., media lubricant and/or contaminants) on the ABS, both during the use process when the media disc is spinning and the slider is positioned above the disc and when the slider is at rest (off of the disc).

Figure 2:
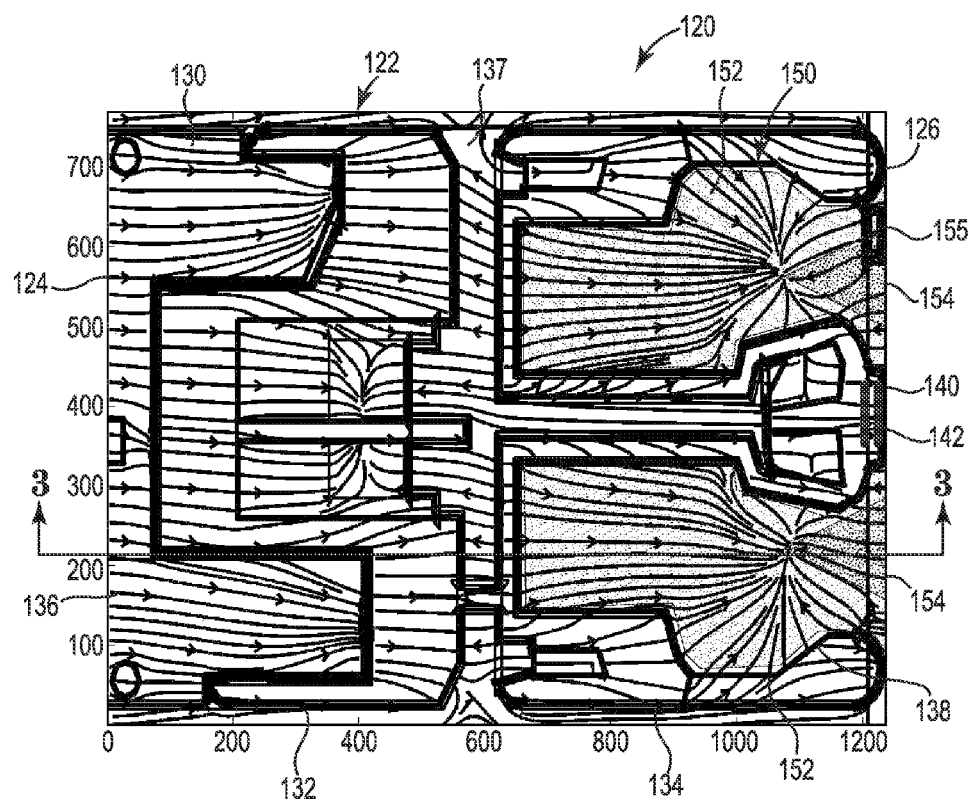
FIG. 2 is a schematic, bottom view of a first embodiment of a slider having a self-assembled monolayer pattern.
Figure 3:
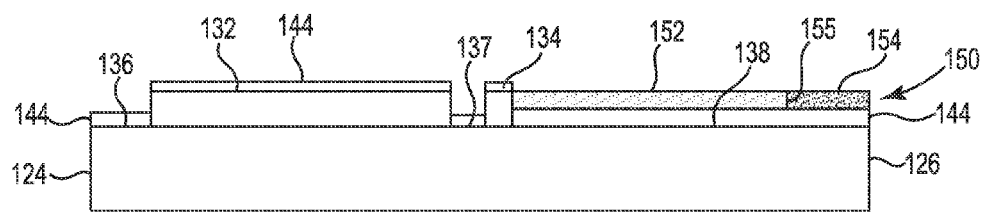
FIG. 3 is a cross-sectional view of the slider of FIG. 2 taken along line 3-3.

In FIGS. 2 and 3, the bottom surface (i.e., the ABS or surface of the slider facing the disc) of the slider includes a patterned high surface energy SAM to wick away fluid (e.g., fluid droplets) from a naturally occurring stagnation region. The bottom surface also includes a patterned low surface energy SAM around the centerpad of the slider in order to reduce lube accumulation and thus clearance settling.

Turning to FIG. 2, the bottom surface (i.e., the ABS or the surface of the slider facing the disc) of a slider is illustrated. Slider 120 has a body 122 defining a leading edge 124 and a trailing edge 126, the locations of which are known to those in the field. Slider 120 includes a working or bottom surface 130 (also known as an advanced air bearing (AAB) surface) that includes various topographical features (e.g., raised features 132, 134 and recessed features 136, 137, 138) that form an ABS. Positioned proximate trailing edge 126 is a read transducer 140 and a write transducer 142. Although one particular embodiment of a slider has been illustrated in FIG. 2, it is understood that the slider may have any number of various alternate configurations of topographical features and locations of read transducer 140 and/or write transducer 142. For example, in some embodiments read transducer 140 and/or write transducer 142 may be located not on bottom surface 130 but on the side wall at trailing edge 126.

Working or bottom surface 130 of slider 120 has a continuous, non-interrupted protective carbon coating 144 thereon, best seen in FIG. 3. Coating 144 is at least 50 Angstroms thick. In some embodiments, protective carbon coating 144 may not be continuous and non-interrupted in recessed features 136, 137, due to the elevation difference between recessed features 136, 137 and raised features 132, 134. In such embodiments, at least raised features 132, 134 have a continuous, non-interrupted protective carbon coating 144 thereon as well as any portion of recessed features 136, 137, 138 that have a SAMS coating thereon.

Present on at least a portion of protective carbon coating 144 is a SAM pattern 150, configured to direct the flow of fluid when the media disc is spinning and slider 120 is positioned above the disc. The SAM pattern 150 may be present on any of raised features 132, 134 and recessed features 136, 137, 138. It is noted that in all locations where SAM pattern 150 is present, it is chemically (e.g., covalently, ionically) adhered to the surface on which it resides, such as on carbon protective overcoat 144 or directly to bottom surface 130.

In FIG. 2, lines of fluid flow are shown; these fluid flow paths are based on the various topographical features (e.g., raised features 132, 134 and recessed features 136, 137, 138) on surface 130, when no SAM pattern is present. SAM pattern 150 facilitates the flow of fluid (e.g., lubricant droplets) across surface 130 to a collection point, and then defines a path by which the fluid leaves surface 130. Pattern 150 is symmetrical about the longitudinal axis of slider 120 (extending from leading edge 124 to trailing edge 126) having a first area 152 and a second area 154. First area 152 has a first SAM present, in this embodiment, a lower surface energy SAM. Second area 154 has a second SAM present, in this embodiment, a high surface energy SAM. For slider 120, both first area 152 and second area 154 are within recessed feature 138.

Pattern 150 has low surface energy first area 152 around a center pad region of slider 120. Low surface energy area 152 is configured to reduce diffusion on the center pad, to thus reduce clearance settling. First area 152 is positioned, shaped and sized to work with the topography and flow patterns of bottom surface 130. Pattern 150 has high surface energy second area 154 downstream of a naturally occurring stagnation region 155, where fluid droplets naturally collect due to the fluid flow paths, extending to trailing edge 126. Second area 154 is positioned, shaped and sized to direct fluid (particularly, any lubricant and/or contaminant droplets) that naturally collect at stagnation region 155 to away from slider 120. With SAM pattern 150 present, fluid (e.g., lubricant and/or contaminant droplets) readily travel along the fluid flow lines through low energy first area 152 to stagnation region 155, where they collect at a corner or tip of high energy second area 154. The presence of the high surface energy second area 154 causes the fluid (e.g., lubricant and/or contaminant droplets) to flow or wick away from stagnation region 155 to trailing edge 126 by capillary force due to the gradient of surface energy between 152 and 154.

As can be seen in FIG. 2, pattern 150 extends from approximately the mid-point line of bottom surface 130 to trailing edge 126, symmetrical about the longitudinal axis of slider 120. In the illustrated embodiment, slider 120, particularly bottom surface 130, has an area of about 900,000 square micrometers (about 900 square mm) and pattern 150 occupies about 20-30% of bottom surface 130, with first area 152 occupying about 90% of pattern 150 and second area 154 occupying about 10% of pattern 150.

Figure 4:
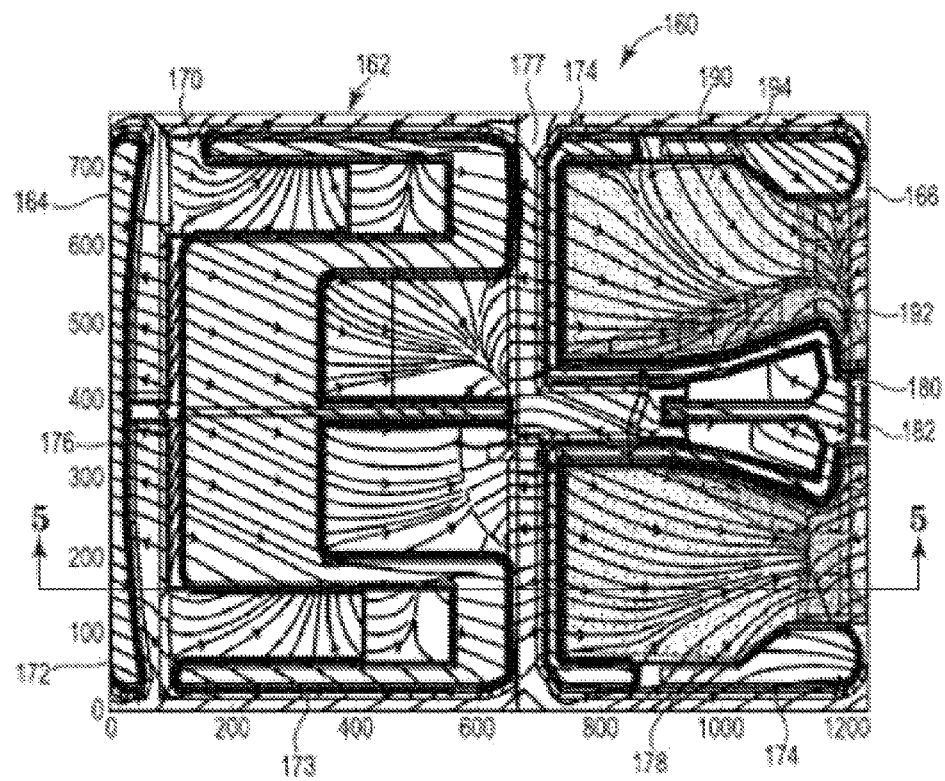
FIG. 4 is a schematic, bottom view of second embodiment of a slider having a self-assembled monolayer pattern.
Figure 5:
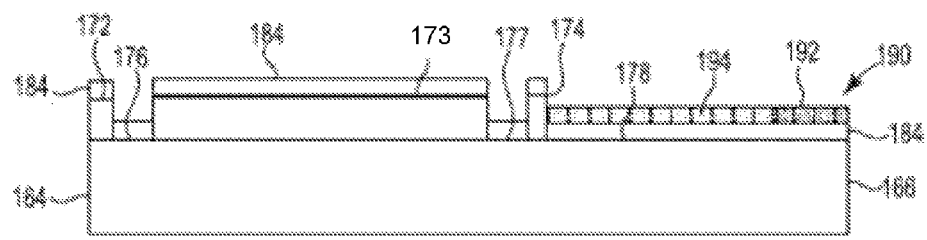
FIG. 5 is a cross-sectional view of the slider of FIG. 4 taken along line 5-5.

In FIGS. 4 and 5, the bottom surface of a slider includes a patterned low surface energy SAM to increase the flow of fluid (e.g., lubricant and/or contaminant droplets) along naturally occurring stagnation lines and a patterned high surface energy SAM laterally outside of the low surface energy area. The slider of FIGS. 4 and 5 has a different surface topography and a different SAM pattern than slider 120 of FIGS. 2 and 3.

Turning to FIG. 4, the bottom surface (i.e., the surface of the slider facing the disc) of a slider is illustrated. Slider 160 has a body 162 defining a leading edge 164 and a trailing edge 166, the locations of which are known to those in the field. Slider 160 includes a working or bottom surface 170 that includes various topographical features (e.g., raised features 172, 173, 174 and recessed features 176, 177, 178) that form an ABS. Positioned proximate trailing edge 166 is a read transducer 180 and a write transducer 182.

Bottom surface 170 of slider 160 has a continuous, non-interrupted protective carbon coating 184 thereon, best seen in FIG. 5. In some embodiments, protective carbon coating 184 may not be continuous and non-interrupted in recessed features 176, 177, 178, due to the elevation difference between recessed features 176, 177, 178 and raised features 172, 173, 174. In such embodiments, at least raised features 172, 173, 174 have a continuous, non-interrupted protective carbon coating 184 thereon. It is noted that in all locations where the SAM pattern is present, it is chemically (e.g., covalently, ionically) adhered to the slider ABS in any of the recessed or raised features mentioned above.

Present on at least a portion of protective carbon coating 184 is a SAM pattern 190, configured to direct the flow of fluid (by capillary force) either when the media disc is spinning and slider 160 is positioned above the disc or when the slider 160 is off of the disc in a non-operational state. Similar to FIG. 2, in FIG. 4 various lines of fluid flow are shown; these fluid flow paths are based on the various topographical features (e.g., raised features 172, 173, 174 and recessed features 176, 177, 178) on surface 170, when no SAM pattern is present. SAM pattern 190 facilitates the flow of fluid (e.g., lubricant and/or contaminant droplets) across surface 170 to a collection point, and then defines a path by which the fluid leaves surface 170, driven by surface energy gradients. Pattern 190 is symmetrical about the longitudinal axis of slider 160 having a first area 192 and a second area 194. First area 192 has a first SAM present, in this embodiment, a lower surface energy SAM. Second area 194 has a second SAM present, in this embodiment, a high surface energy SAM. For slider 160, both first area 192 and second area 194 are within recessed feature 178 in this example.

Pattern 190 has low surface energy first area 192 present in areas where stagnation lines in the fluid flow naturally occur. High surface energy second area 194 is positioned laterally outside of first area 192. Additionally, a small portion of second area 194 is discontinuous from a larger portion of second area 194, the small portion being downstream of first area 192 and immediately adjacent trailing edge 166. Pattern 190 provides smooth channeling of fluid (e.g., lubricant droplets) away from and out of the ABS and the AAB, thus reducing contaminant accumulation on read transducer 180 and/or write transducer 182.

As can be seen in FIG. 4, slider 160 has a length of about 1220 micrometers from leading edge 164 to trailing edge 166, and pattern 190 begins approximately 750 micrometers from leading edge 164 and extends to trailing edge 166, symmetrical about the longitudinal axis of slider 160. In the illustrated embodiment, slider 160, particularly bottom surface 170, has an area of about 900,000 square micrometers (about 900 square mm) and pattern 190 occupies about 20-30% of bottom surface 170, with first area 192 occupying about ⅓ of pattern 190 and second area 194 occupying about ⅔ of pattern 190.

Thus, embodiments of the SLIDER WITH SELF-ASSEMBLED MONOLAYER PATTERN are disclosed. The self-assembled monolayer pattern (SAM) is configured to direct the flow of fluid across the working surface of the slider in an efficient manner. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A slider comprising a leading edge, a trailing edge, a working surface, and read/write heads proximate the trailing edge, the slider comprising:
   a continuous protective overcoat having a thickness of at least 50 Angstroms over the working surface of the slider; and
   a self-assembled monolayer coating on the working surface of the slider and over the protective overcoat, the coating comprising at least one low surface energy self-assembled monolayer material and at least one high surface energy self-assembled monolayer material.

2. The slider of claim 1 wherein the low surface energy material is a fluorinated-organosilane self-assembled monolayer material.

3. The slider of claim 1 wherein the high surface energy material is an amino-organosilane self assembled monolayer material.

4. The slider of claim 1 wherein the high surface energy material extends to the trailing edge of the slider.

5. The slider of claim 1 wherein the self-assembled monolayer coating occupies at least 20% of the working surface of the slider.

6. The slider of claim 1 wherein the working surface of the slider comprises a recessed feature and raised feature, and wherein the self-assembled monolayer coating is present in both the recessed feature and raised feature.

7. The slider of claim 6 wherein the low surface energy self-assembled material is present in the recessed feature.

8. The slider of claim 6 wherein the high surface energy self-assembled material is present in the recessed feature.

9. The slider of claim 1 wherein the self-assembled monolayer coating is shaped and sized to direct fluid flow away from the read/write heads and to the trailing edge of the slider.

10. The slider of claim 1 wherein the high surface energy self-assembled material and the low surface energy self-assembled material are present in a predetermined pattern.

11. A slider comprising a leading edge, a trailing edge, a working surface having at least one recessed feature extending to the trailing edge, the slider further comprising:
    a continuous protective overcoat on at least a portion of the working surface; and
    a self-assembled monolayer coating on at least a portion of the protective overcoat, the coating comprising at least one low surface energy self-assembled monolayer material and at least one high surface energy self-assembled monolayer material.

12. The slider of claim 11 wherein the high surface energy material is an amino-organosilane self assembled monolayer material.

13. The slider of claim 11 wherein the low surface energy material is a fluorinated-organosilane self-assembled monolayer material.

14. The slider of claim 11 wherein the self-assembled monolayer coating comprises two or more self-assembled monolayer materials with multiple SAM molecule moieties.

15. The slider of claim 14 wherein the two or more self-assembled monolayer materials are randomized.

16. The slider of claim 11 wherein the high surface energy self-assembled material and the low surface energy self-assembled material are present in a predetermined pattern.

17. The slider of claim 16 wherein the predetermined pattern is symmetrical about a longitudinal axis of the slider.

18. A slider comprising a leading edge, a trailing edge, a working surface, read/write heads proximate the trailing edge, and a longitudinal axis extending from the leading edge to the trailing edge, the slider comprising:
 a predetermined pattern of a low surface energy self-assembled monolayer coating and a high surface energy self-assembled monolayer coating on the working surface of the slider, the predetermined pattern being symmetrical about the longitudinal axis.

19. The slider of claim 18 wherein the predetermined pattern extends to the trailing edge.

* * * * *